(12) United States Patent
Bennett et al.

(10) Patent No.: US 8,369,831 B2
(45) Date of Patent: Feb. 5, 2013

(54) SINGLE OPERATOR, SINGLE SIM, SINGLE BILLING ENTITY SUPPORTING SIMULTANEOUS USE OF MULTI-RADIO DEVICE AND/OR PHONE

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 892 days.

(21) Appl. No.: 12/365,023

(22) Filed: Feb. 3, 2009

(65) Prior Publication Data
US 2010/0197281 A1  Aug. 5, 2010

(51) Int. Cl.
*H04M 1/66* (2006.01)
(52) U.S. Cl. ............ 455/410; 455/411; 455/414.1; 455/432.1; 455/435.1; 455/435.2; 455/435.3; 455/436; 455/437; 455/438; 455/439; 455/440; 455/441; 455/442; 455/443; 455/444
(58) Field of Classification Search .......... 455/410, 455/411, 414.1, 432.1, 435.1–444
See application file for complete search history.

(56) References Cited

U.S. PATENT DOCUMENTS

| | | | |
|---|---|---|---|
| 2004/0066769 A1* | 4/2004 | Ahmavaara et al. | 370/338 |
| 2006/0211447 A1* | 9/2006 | Purkayastha et al. | 455/552.1 |

* cited by examiner

*Primary Examiner* — Dwayne Bost
*Assistant Examiner* — Yungsang Lau
(74) *Attorney, Agent, or Firm* — Brinks Hofer Gilson & Lione

(57) ABSTRACT

A mobile wireless communication device may communicate information to a first network device for enabling authentication, authorization and/or management of accounting for the mobile wireless communication device for use within a first network. A SIM may enable a communication session with a second network based on data sent to the second network related to the authentication, authorization and/or accounting management for use in the first network. The mobile wireless communication device may be handed-off to the second network and/or may establish simultaneous communication sessions with the first network and the second network without communicating authentication, authorization and/or accounting information to the second network. The first and/or second network and/or another network device may comprise and/or share a session control server. The mobile wireless communication device may receive, store and/or modify additional information associated with the authentication, authorization and/or accounting management from the second network device.

20 Claims, 4 Drawing Sheets

SINGLE OPERATOR, SINGLE SIM, SINGLE BILLING ENTITY SUPPORTING SIMULTANEOUS USE OF MULTI-RADIO DEVICE AND/OR PHONE

CROSS-REFERENCE TO RELATED APPLICATIONS/INCORPORATION BY REFERENCE

This patent application makes reference to U.S. patent application Ser. No. 12/365,015 filed on even date herewith.

The above stated application is hereby incorporated herein by reference in its entirety.

FIELD OF THE INVENTION

Certain embodiments of the invention relate to communication systems. More specifically, certain embodiments of the invention relate to a method and system for a single operator, single SIM, single billing entity supporting simultaneous use of a multi-radio device and/or a phone.

BACKGROUND OF THE INVENTION

For many people, utilizing a plurality of wireless electronic devices has become a part of everyday life. Many wireless devices have evolved from a convenient method for voice communication to multi-functional resources that offer, for example, still and moving image features, media playback, electronic gaming, Internet browsing, and email. Cellular phones with built-in cameras, or camera phones, have become prevalent in the mobile phone market, due to the low cost of CMOS image sensors and the ever increasing customer demand for more advanced cellular phones. Increasingly, multi-mode wireless devices that comprise a plurality of radio interfaces enable communication via a variety of wireless network technologies.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a single operator, single SIM, single billing entity supporting simultaneous use of a multi-radio device and/or a phone, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the invention may be found in a method and system for a single operator, single SIM, single billing entity supporting simultaneous use of a multi-radio device and/or a phone. A mobile wireless communication device may communicate information to a first network device such that the first network device may authenticate, authorize and/or manage accounting for the mobile wireless communication device for use within the first network. When the mobile wireless communication device is within a service area of a second wireless network, a communication session may be established with the second network based on the authentication, authorization and/or accounting management for the first network device. In this regard, the first network device communicates data related to the authentication, authorization and/or accounting management to a second network device in the second network to enable the communication session with the mobile wireless communication device. A subscriber identity module (SIM) of the mobile wireless communication device comprises information that enables the first network device to communicate the data to the second network device. In this regard, the mobile wireless communication device may establish the communication session with the second network without transferring the authentication, authorization and/or accounting management information to the second network device. For example, during a communication session with the first network, the mobile wireless communication device may hand-off to the second network. Furthermore, the mobile wireless communication device may establish simultaneous communication sessions with the first network and the second network utilizing the data related to the authentication, authorization and/or accounting management. The first network device and the second network device and/or another network device that enables the authentication, the authorization and/or the accounting management may comprise a session control server. The session control server may be shared by the first network and the second network. In various embodiments of the invention, the mobile wireless communication device may receive, store and/or modify additional information associated with the authentication, authorization and/or accounting management from the second network device.

Figure 1A:
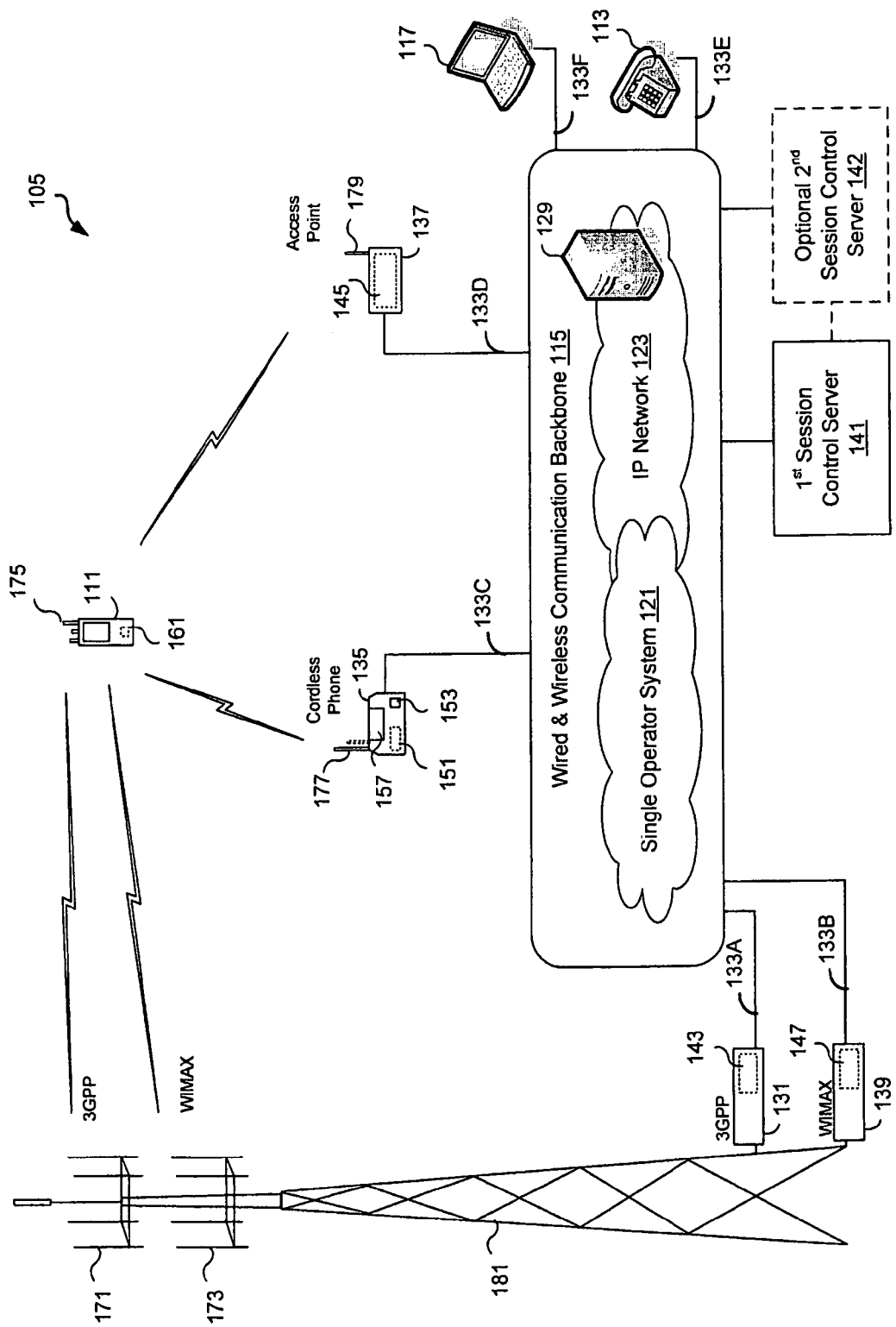
FIG. 1A is a block diagram illustrating a multimode wireless device that is operable to communicate via a plurality of networks that are operated by a single service provider, in accordance with an embodiment of the invention.

FIG. 1A is a block diagram illustrating a multimode wireless device that is operable to communicate via a plurality of networks that are operated by a single service provider, in accordance with an embodiment of the invention. Referring to FIG. 1A, there is shown, a communication system 105 comprising a communication backbone 115, a single operator system 121, an IP network 123, an application server 129, a telephone 113, a laptop 117, a communication link 133E, a multimode wireless device 111, one or more antennas 175, and a subscriber identity module (SIM) 161. FIG. 1A also shows a 3GPP base station 131, network access server 143, one or more antennas 171, backhaul link 133A, a WIMAX base station 139, network access server 147, backhaul link 133B, one or more antennas 173, a cordless phone base 135, and a localized network access server (LNAS) 151. FIG. 1A further shows a charging dock 157, user interface button 153, one or more antennas 177, backhaul 133C, wireless local area network access point (WLAN AP) 137, network access server 145, one or more antennas 179, backhaul 133D, a session control server (SCS) 141 and an optional second session control server (SCS) 142.

The multimode wireless device 111 comprises suitable logic circuitry and/or code that is operable to communicate voice and/or data via one or more wireless technologies to one or more access points and/or base stations 131, 135, 137 and/or 139. The multimode wireless device 111 comprises one or more antennas 175 that are operable to support multi-mode transmissions. Any suitable antenna technology, for example, smart antennas and/or beamforming may be utilized. In addition, the multimode wireless device comprises the subscriber identity module (SIM) 161. The SIM 161 is a removable IC circuit card that stores subscriber's security credentials, for example, a subscriber security key. The SIM card 161 comprises information that enables an authenticating entity, for example, the SCS 141 or the 3GPP base station 131 to authenticate the SIM 161 for a plurality of networks. Although the multi-mode wireless device shown in FIG. 1A comprises the SIM 161, the invention is not limited in this regard and embodies any suitable subscriber card such as a universal integrated circuit card (UICC) and/or a removable user identity module (RUIM) that comprises the information that enables an authenticating entity to authenticate a multi-mode communication device for a plurality of networks. In addition, the invention is not limited with regard to any specific type of wireless technology. For example, the multimode wireless device 111 is operable to communicate via one or more of 3GPP, 3GPP2, LTE, WIMAX, WiFi, WLAN, Bluetooth as well as cordless phone standards such as DECT and/or PHS. In various embodiments of invention, the multi-mode wireless device is operable to support multiple sessions with multiple networks within the single operator system 121.

In various exemplary embodiments of the invention the multimode wireless device 111 is operable to be handed off between multiple networks within the single operator system 121. In this regard, the multimode wireless device 111 is operable to gain access to a network within the single operator system 121 based on an authentication, authorization and/or accounting (AAA) voucher from another network within the single operator system 121. For example, the multimode wireless device 111 is operable to conduct AAA transactions with a first network and subsequently access a second network based on assurance and/or a voucher from the first network. The assurance and/or voucher are communicated from the first network to the second network indicating that the multimode wireless device 111 is authenticated. The assurance and/or voucher may additionally comprise other information derived from the AAA transaction, for example, authorization and/or accounting information. The multimode wireless communication device 111 is shown as a portable phone within the FIG. 1A however, the invention is not so limited and comprises any suitable multimode wireless device. Exemplary embodiments of the multimode wireless communication device 111 are a laptop, a cabled or wireless headset, a media player, a game device and/or a geo-location device.

The communication backbone 115 comprises suitable logic circuitry and/or code to enable wired and/or wireless communication between a plurality of networks and/or sub-networks owned and/or operated by a single entity. A service provider, network operator and operator represent an entity that owns, leases and/or operates the one or more communication networks. The communication backbone 115 comprises a plurality of communicatively coupled wired and/or wireless networks. The communication backbone is communicatively coupled to the single operator system 121, the IP network 123, the application server 129, a plurality of base stations and/or access points (AP) 131, 135, 137 and/or 139, the telephone 113 and one or more session control servers (SCS) 141 and/or 142. In various embodiments of the invention, the communication backbone 115 enables communication of authentication, authorization and/or accounting (AAA) vouchers between the plurality of networks and the session control servers 141 and/or 142. In this regard, the AAA vouching comprises giving assurance that a successful AAA transaction has been conducted between a network and a multi-mode wireless device and may additionally comprise providing information regarding the AAA transaction.

The single operator system 121 comprises suitable logic, circuitry and/or code that are operable to communicate via a plurality of wireless technologies with the multimode wireless device 111. In this regard, the single operator system 121 comprises a heterogeneous plurality of wired and/or wireless networks. One or more of the heterogeneous plurality of networks are operable to engage in simultaneous sessions and/or calls with the multi-mode wireless device 111. In addition, the multi-mode wireless device 111 is operable to handoff between the networks. In various embodiments of the invention, a simultaneous session and/or a handoff between two or more networks within the single operator system 121 may be enabled by an AAA voucher.

The IP network 121 comprises suitable logic, circuitry and/or code that are operable to communicate packet data across an internetwork, for example, the IP network 121, which may be the Internet. The IP network 123 may be communicatively coupled to the communication backbone 115, the single operator system 121, the various base stations and APs 131, 135, 137 and/or 139, the application server 129 and optionally, the telephone 113.

The 3GPP base station 131 comprises suitable logic, circuitry and/or code to support cellular telecommunications technology. For example, the 3GPP base station 131 is operable to communicate with the multimode wireless device 111 via the one or more antennas 171. In addition, the 3GPP base station 131 is operable to communicate with the single operator network system 121 via the network access server 143 and the backhaul 133A. The network access server 143 is operable to control access to various entities communicatively coupled via the backhaul 133A and the communication backbone 115. For example, the network access server 143 may communicate with the session control server (SCS) 141 in order to conduct AAA transactions between the multimode wireless device 111 and the SCS 141. In addition, the network access server 143 may control access by the multimode wireless phone 111 various entities such as the application server 129 on the IP network 123, the laptop 117 or the telephone 113 that may be connected via a public switched telephone network (PSTN). The backhaul 133A comprises a wireless and/or cable link between the 3GPP base station 131 and the single operator network system 121. In various embodiments of the invention, the 3GPP base station 131 may support simultaneous communication sessions and/or handoffs with another network within the single operator system 121 that may be enabled by an AAA voucher.

In various embodiments of the invention, the 3GPP base station 131 and one or more antennas 171 may be located indoors or outdoors. Furthermore, the 3GPP base station 131 may be part of an overlay-underlay cellular network configuration where more powerful and expansive WWAN APs and/or base stations act as an umbrella serving a wider geographic serving area and underlay base stations and/or APs fill in smaller serving areas within the umbrella. In this regard, overlay and underlay base stations and/or APs may provide the capability to handoff from one to another and/or may simultaneously serve the same multimode wireless device 111. In various embodiments of the invention, the 3GPP base station 131 and/or one or more antennas 171 may be installed on a moving object, for example, an aircraft or train where the one or more antennas 171 may be air to ground antennas. The one or more antennas 171 are shown as a being contained within a single whip antenna. Notwithstanding, any suitable antenna may be utilized. For example, omni-directional or directional antennas, panel antennas, antenna arrays, smart antennas and/or any suitable SISO, SIMO, MISO, MIMO system may be utilized.

The WIMAX base station 139 comprises suitable logic, circuitry and/or code that are operable to communicate with the multimode wireless device 111 via the one or more antennas 173 as well as the single operator network 121 via the backhaul 133B. The backhaul 133B may comprise any suitable wireless and/or cabled physical medium and utilize any suitable communication protocols. The WIMAX base station 139 is part of a cellular system, for example, a system based on the WIMAX standards, and provides the capability to handoff from one base station to another and or from a WIMAX base station to a base station and/or AP of another type of network. In this regard, the WIMAX base station 139 may provide the capability to handoff to another cellular system, a WiFi system and/or a wireless portable phone docking station for example.

The WIMAX base station 139 comprises the network access server 147 that is operable to control access various entities communicatively coupled via the backhaul 133B and the communication backbone 115. For example, the network access server 147 may communicate with the session control server (SCS) 141 in order to conduct AAA transactions between the multimode wireless device 111 and the SCS 141. In various embodiments of the invention, the WIMAX base station 139 supports simultaneous sessions and/or handoffs to other networks within the single operator system 121 that are enabled by AAA vouching. In addition, the network access server 147 controls access by the multimode wireless phone 111 to various entities such as the application server 129 on the IP network 123 or the telephone 113 that may be connected via a public switched telephone network (PSTN). The base station 139 and one or more antennas 173 may be installed in any appropriate manner as described with respect to the 3GPP base station 131 and the one or more antennas 171.

The cordless phone base 135 comprises suitable logic, circuitry and/or code that are operable to communicate with the multimode wireless device 111 via the one or more antennas 177. For example, one or more of the antennas 177 may handle transmissions when the phone is or is not docked in the cordless phone base 135. In instances when the multimode wireless device 111 is docked, the device and phone base may communicate via a cabled connection. Moreover, the cordless phone base 135 is operable to communicate with the single operator network 121 via the backhaul 133C which may be a twisted pair or HFC cable, for example. Exemplary cordless phone technologies that may be utilized within the scope of the invention comprise DECT and PHS. The cordless phone base 135 may also be operable to communicate via Bluetooth and/or various 802.11 standards for example. In addition, the one or more antennas 177 may comprise any suitable antenna and/or antenna system. The cordless phone base 135 provides the capability for the multimode phone 111 to handoff to and/or from other cordless phone bases as well as to and/or from other network APs and or base stations. For example, the multimode wireless phone 111 is operable to handoff from the cordless phone base 135 to one or more of the 3GPP base station 131, the WIMAX base station 139 and the WLAN AP 137.

The cordless phone base 135 comprises the charging block 157 where the multimode wireless device 111 may be docked, recharged and/or engage in communication. For example, the multimode wireless device 111 may communicate via the cordless phone base 135 to various entities connected to the communication backbone 115 in instances when the device 111 is docked or is not docked. In addition, the cordless phone base 135 comprises a localized network access server (LNAS) 151. The LNAS 151 is similar to the network access server 143 and/or network access server 147. Notwithstanding, the LNAS 151 is operable to authenticate the multimode wireless device 111 independent of the SCS 141. In this regard, the LNAS 151 is operable to handle authentication transactions with the multimode wireless device 111 and in some instances may facilitate authorization and/or accounting transactions with the SCS 141. The LNAS 151 also facilitates connections with other entities within the communication system 105. The cordless phone base 135 comprises a user interface button 153 that provides a user the capability to associate and/or pre-authenticate a device that is docked in the cordless phone base 135. In this manner, the associated devices may forego further localized authentication transactions when docked. In various embodiments of the invention, the cordless phone base 135 may support simultaneous sessions and/or handoffs with other networks within the single operator system 121 wherein simultaneous sessions and/or handoffs may be enabled by an AAA voucher from the SCS 141.

The wireless local area network access point (WLAN AP) 137 comprises suitable logic, circuitry and/or code that is operable to communicate with the multimode wireless device 111 via one or more of the antennas 179 as well as to the communication backbone 115 and the backhaul 133D. The WLAN AP 137 comprises the network access server 145 which is similar and/or substantially the same as the network access server 143, 147 and/or LNAS 151. The WLAN AP 137 is operable to support simultaneous sessions and/or handoffs with other networks within the single operator system 121 wherein simultaneous sessions and/or handoffs may be enabled by an AAA voucher from the SCS 141.

Although FIG. 1A comprises a plurality of exemplary base stations and/or access points 131, 135, 137 and 139 the invention is not limited in this regard. Exemplary embodiments of the invention comprise any suitable wireless communication device that is operable to provide access to the single operator system 121. For example, any suitable AP, base station and/or wireless router that is operable to communicate with the multi-mode wireless device 111 falls within the scope of the invention. In addition, the present invention is not limited to any specific wireless technology. Various exemplary embodiments of the invention utilize a variety of suitable wireless technologies. For example, 3GPP, 3GPP2, WIMAX, WiFi, LTE, WLAN, Bluetooth, Zigbee as well as other wireless technologies are supported by the multi-mode wireless device 111 and the various base stations, APs and/or wireless routers.

The telephone 113 comprises suitable logic, circuitry and/or code that are operable to handle a call and/or session with the multimode wireless device 111. The telephone 113 may be any suitable wireless and/or cabled device that is operable to handle the call or session, for example, a telecommunications module within a laptop and/or a Skype headset for example. The telephone 113 is communicatively coupled to the communication backbone 115 via a wireless link and/or any suitable cable medium 133E.

The laptop 117 comprises suitable logic circuitry and/or code that is operable to communicate via the IP network 123. The laptop 117 comprises software that is operable to initiate a call with and/or receive a call from the multimode wireless device 111 via the IP network 123. For example, the laptop 117 may comprise Skype software or other voice over Internet protocol (VoIP) communication software. In various embodiments of the invention a headset and/or speakers, display, camera and/or microphone may be utilized with the laptop 117 for phone conversations.

The application server 129 comprises suitable logic, circuitry and/or code that are operable to communicate and/or download data to the multimode wireless device 111 via a plurality of paths. For example, the application server 129 is operable to communicate data via the IP network 123, the single operator's network 121 and the 3GPP base station 131. Alternatively, the application server 129 communicates data to the multimode wireless device 111 via the IP network 123, the single operator network 121 and the WIMAX base station 131. The application server 129 may comprise any suitable IP network server and/or Internet server, for example, the application server 129 may comprise a video server or multimedia server. Multimedia information handled by the multimedia server comprises text, voice, video and/or data.

The session control server (SCS) 141 comprises suitable logic circuitry and/or code to handle authentication, authorization and/or accounting transactions for the multimode wireless device 111. In this regard, the SCS 141, is operable to authenticate and/or approve access to a network within the single operator system 121. The SCS 141 may authenticate the multimode wireless device 111 upon receiving a digital identity and/or security credentials for the device and/or user of the device such as a subscriber service ID from the SIM 161, password, token, digital certificate and/or phone number for example. In addition, the SCS 141 is operable to authorize various privileges and/or services for the multimode wireless device 111 based on authentication results and restrictions that may apply. Also, the SCS 141 is operable to handle accounting for the multimode wireless device 111 by tracking resource usage that may be utilized for billing and/or other purposes.

The kind of accounting that is utilized may depend on, for example, the types of resources that are being consumed. For example, accounting procedures for continuous circuit switched voice calls may be different than that for bursts of data transmissions. An exemplary session control server 141 communicates based on RADIUS protocol or Diameter protocol. The SCS 141 is communicatively coupled with the network access server 143, network access server 147, LNAS 151 and/or network access server 145 via the communication backbone 115. In various embodiments of the invention, one SCS such as SCS 141 is operable to manage AAA transactions for a heterogeneous plurality networks operated by a single service provider. Notwithstanding, in other embodiments of the invention, a plurality of SCSs may be deployed to manage the heterogeneous plurality networks. In this regard, the plurality of deployed SCSs are operable to communicate with each other.

In various embodiments of the invention, the SCS 141 is operable to authorize access to one or more of the operator networks based on authentication, authorization and/or accounting transactions that were performed for a prior access attempt to another of the operator's networks. For example, in instances when the multimode wireless device 111 is handed off between different networks within the single operator network 121 or has simultaneous sessions on different networks within the single operator network 121, the SCS 141 may vouch for the credibility of the device 111 to the second network. In this regard, the wireless multimode device 111 may gain access to the second network without having to re-authenticate, re-authorize and/or re-initiate accounting. In various embodiments of the invention, the SCS 141 may handle authorization and/or accounting for the multimode wireless device 111 subsequent to the vouching.

In operation, the multimode wireless device 111 attempts to call an entity within the communication system 105, for example, the telephone 113. The multimode wireless device 111 may attempt to call the telephone 113 via the 3GPP base station 131 for example. In this regard, the multimode wireless device 111 sends a request to the network access server 143 comprising its identity and/or its security credentials, for example, its service subscriber key from the SIM 161. The network access server 143 sends the identity and/or security credentials in an access request to the SCS 141 utilizing, for example, the RADIUS protocol. The SCS 141 authenticates the identification and/or security credentials. In instances when authentication is successful, the SCS 141 authorizes access and grants privileges to the multimode wireless device 111. In addition, the SCS 141 establishes and may maintain accounting for the requested session. The network access server 143 then establishes a session between the multimode wireless device 111 and the telephone 113. During the established session, the wireless multimode device 111 requests access to a second entity in the communication system 105, for example, the application server 129 connected to the Internet 123. In this regard the second request is sent to a second network within the single operator system 121, for example, a WIMAX network. The multimode wireless device sends a request comprising at least its identity to the network access server 147 in the WIMAX base station 139 comprising a request for a AAA voucher to access the application server 129. The network access server 147 sends a corresponding voucher request to the SCS 141. The SCS 141 determines authentication, authorization and/or accounting results based on the prior AAA transactions that were conducted for the call made to the telephone 113 via the 3GPP base station 131. The SCS 141 may be operable to grant the access to the multimode wireless device 111 for a second session with the application server 129 accordingly. The application server 129 is operable to stream video to the multimode wireless device 111 via the IP network 123, the single operator network 121 and the WIMAX base station 139. In this manner, the multimode wireless device 111 engages in simultaneous sessions on two different networks within the single operator system 121 without having to conduct a second round of authentication, authorization and/or accounting transactions for the second session. In addition, the SCS 141 grants privileges for the second session and manages accounting for the both sessions.

In various embodiments of the invention, the multimode wireless device 111 may conduct AAA transactions with the SCS 141 prior to requesting a session and/or call. For example, when the multimode wireless device is powered up, it may register with one of the networks in the single operator system 121. For example, the multimode wireless device 111 may register with the 3GPP base station 131 and conduct AAA transactions with the SCS 141. The SCS 141 authenticates the multimode wireless device and/or authorizes various permissions, features and/or service plans that are available to the device from one or more networks within the single operator system 121. The multimode wireless device subsequently initiates a call and/or communication session via one or more of the base stations and/or the APs 131, 135, 139 or 137 which sends a request for an AAA access voucher from the SCS 141. In this regard, the multimode wireless device 111 may establish one or more communication sessions and/ or calls with one or more networks within the single operator system 121 without having to conduct a full second round of AAA transactions with the SCS 141.

Figure 1B:
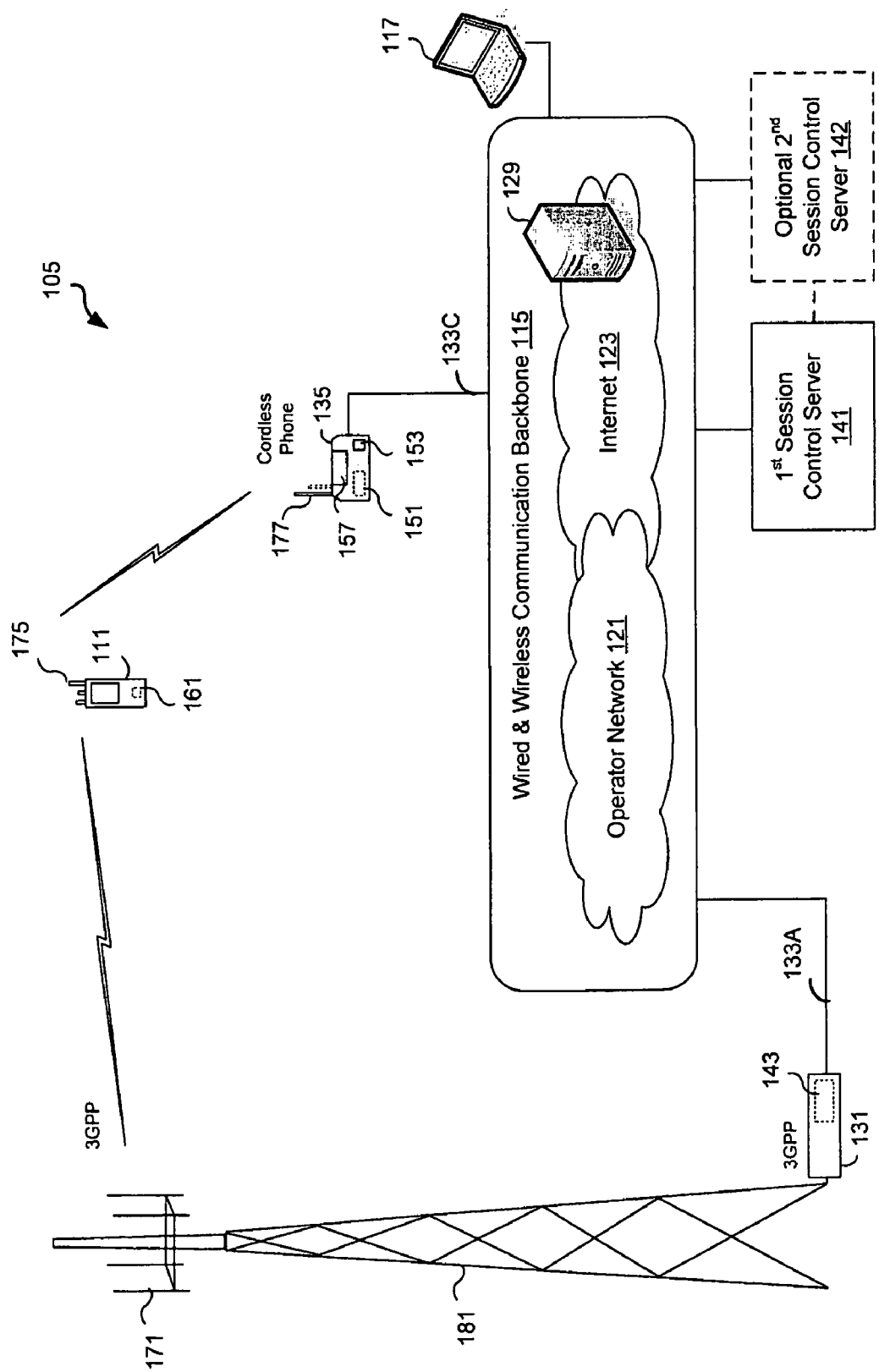
FIG. 1B is a block diagram illustrating a multimode wireless device enabled to handoff to a network based on an authentication, authorization and/or accounting voucher, in accordance with an embodiment of the invention.

FIG. 1B is a block diagram illustrating a multimode wireless device enabled to handoff to a network based on an authentication, authorization and/or accounting voucher, in accordance with an embodiment of the invention. Referring to FIG. 1B, there is shown a portion of the communication system 105 comprising the communication backbone 115, the single operator system 121, the application server 129, the laptop 117 and the IP network 123. In addition, the multimode wireless device 111 comprising one or more antennas 175, the subscriber identity module (SIM) 161 are shown. Another portion of communication system 105 comprises the 3GPP base station 131, the network access server 143, the backhaul link 133A and the one or more antennas 171. Furthermore, the cordless phone base 135, the localized network access server (LNAS) 151, charging dock 157, user interface button 153, one or more antennas 177, backhaul 133C, the session control server (SCS) 141 and the optional second session control server (SCS) 142 are shown in FIG. 1B.

In operation, a user of the multimode wireless device 111 may be located outside the serving area of the cordless phone 135 and within the serving area of the of the 3GPP base station 131. A call is initiated by the user to the laptop 117 comprising Skype software. The multimode wireless device 111 is operable to communicate a request to the network access server 143, to call the laptop 117 and provides its identity and/or its security credentials, for example, its service subscriber key from SIM 161. The network access server 143 sends the identity and/or security credentials in an access request to the SCS 141 utilizing, for example, RADIUS protocol. The SCS 141 authenticates the multimode wireless device 111 based on the received identity and/or security credentials. In instances when authentication is successful, the SCS 141 authorizes access and grants privileges to the multimode wireless device 111. In addition, the SCS 141 establishes and may maintain accounting for the requested call. The network access server 143 then establishes a call between the multimode wireless device 111 and the laptop 117. During the established call, the user moves the multimode wireless device 111 into the serving area of the cordless phone base 135. The multimode wireless device 111 requests a handoff to the cordless phone base 135. In this regard, the multimode wireless device 111 is operable to communicate a handoff request comprising at least its identity to the local network access server 151 in the cordless phone base 135. The local network access server 151 sends a corresponding handoff voucher request to the SCS 141.

The SCS 141 determines authentication, authorization and/or accounting results based on the prior AAA transactions conducted when the multimode wireless device initiated the call to the laptop 117 via the 3GPP base station 131. The SCS 141 authorizes the handoff, accordingly. The call path is switched from the 3GPP base station 131 to the cordless phone base 135 without a second round of AAA transactions and the call continues between the multimode wireless device 111 and the laptop 117 comprising Skype software. In addition, the SCS 141 grants privileges and manages accounting for the multimode wireless phone 111 after the handoff. Although the exemplary AAA vouching for access to the second network during the handoff occurred while a call between two phones was in progress, the scope of the invention is not limited in this regard. For example, a plurality of any suitable types of communication devices, for example, a telephone, PC, media device and/or location device may be utilized during the handoff. In addition, any suitable call or session may be handed off between base stations and/or APs, for example, a circuit switched voice call, an Internet session, streaming video and/or messaging are enabled to utilize AAA vouching in lieu of a second round of AAA transactions when handing-off between different networks in a single operator communication system.

Figure 2A:
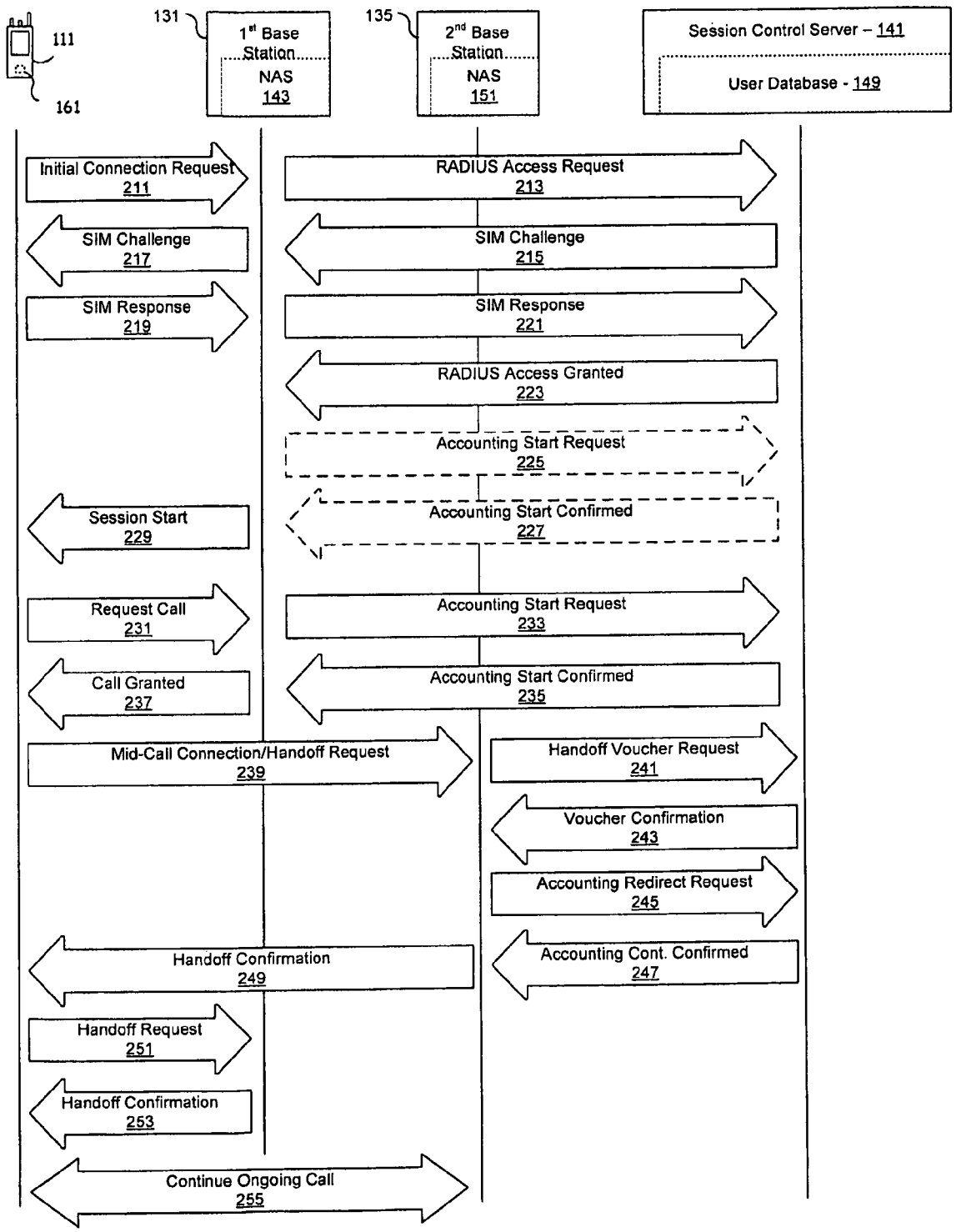
FIG. 2A is a flow diagram illustrating exemplary handoff between networks enabled by an authentication, authorization and/or accounting voucher, in accordance with an embodiment of the invention.

FIG. 2A is a flow diagram illustrating exemplary handoff between networks enabled by an authentication, authorization and/or accounting voucher, in accordance with an embodiment of the invention. Referring to FIG. 2A, there is shown the multimode wireless device 111, the 3GPP base station 131, the network access server 143, the cordless phone base AP 135, the LNAS 151, the session control server 141 and a user data base 149.

The wireless device 111, the SIM 161, the 3GPP base station 131, the network access server 143, the cordless phone base 135, the LNAS 151, the session control server (SCS) 141 are similar and/or substantially the same as the respective picture elements described with respect to FIG. 1A and 1B. The user database 149 comprises subscriber and/or device data that is utilized during AAA transactions. For example, the user database 149 may comprise identity and/or security credentials for the user and/or the multimode wireless device 111, such as the subscriber service key.

In step 211, the multimode wireless device 111 sends an initial connection request to the 3GPP base station 131. In step 213, the network access server 143 sends a request utilizing RADIUS protocol, for example, to the SCS 141. In step 215, the SCS 141 sends a SIM challenge for the multimode wireless device 111 to the network access server 143. In various embodiments of the invention, the SIM challenge may comprise a number sequence. In step 217, the network access server 143 sends the SIM challenge to the multimode wireless device 111. In step 219, the multimode wirless device 111 determines a response to the SIM challenge based on its identity and/or security credentials. For example, the multimode wireless device 111 is operable to process the received number sequence with its subscriber service key and a hashing function to determine the SIM response. The multimode wireless device 111 is operable to communicate a SIM response to the network access server 143. In step 221, the network access server 143 sends the SIM response to the SCS 141. In step 223, the SCS 141 determines the validity of the received SIM challenge response, determines priviliges and/ or permissions allowed for the multimode wireless device and/or determines applicable accounting methods or procedures for the multimode wireless device 111. The SCS 141 sends a message to the network access server 143 utilizing RADIUS protocol for example, that grants access and/or permissions to the multimode wireless device 111. In step 225, the network access server 143 may optionally request a start of accounting procedures that may enable billing to the SCS 141. In step 227, the SCS 141 may optionally initiate accounting procedures for the multimode wireless device 111 and send an accounting start confirmed message to the network access server 143. In step 229, the network access server 143 sends a session start to the multimode wireless device 111. In step 231, a call request may be sent from the multimode wireless device 111 to the network access server 143, for example, a user may initiate a call or data exchange to an entity within the communication system 105 such as the laptop 117. In step 233, the network access server 143 is operable to communicate an accounting start request to the SCS 141. In step 235, the SCS 141 may determine accounting procedures for the requested call and may return an accounting start confirmed message to the network access server 143. In step 237, the network access server 143 may send a call granted message to the multimode wireless device 111 and a call may begin between the multimode wireless device 111 and the laptop 117 comprising Skype software or other VoIP communication software for example. In step 239, during the call, the multimode wireless device 111 and/or the single operator system 121 determines that a different base station or AP, for example, the cordless phone base 135, that is part of a different network within the single operator system 121, may handle the call between the multimode wireless device 111 and the laptop 117. A handoff to the other network is initiated. The multimode wireless device 111 sends a handoff request to the LNAS 151 in the cordless phone base 135. In step 241, the LNAS 151 sends a handoff AAA voucher request to the SCS 141. In step 243, the SCS 141 determines authentication, authorization and/or accounting status for the multimode wireless device 111 based on the prior AAA transactions performed for step 223. The SCS 141 sends an AAA voucher to the LNAS 151. In step 245, the LNAS 151 sends a request to redirect accounting for the continuing call in order to handle the new connection between the multimode wireless device 111 and the cordless phone base 135. In step 247, the SCS 141 sends confirmation of the accounting redirection to the LNAS 151. In step 249, the LNAS 151 sends the multimode wireless device 111 confirmation of the request for a handoff. In step 251, the multimode wireless device 111 may send a request to the network access server 143 to handoff call and/or discontinue service from the 3GPP base station 131 for the call. In step 253, the 3GPP base station 131 may confirm the handoff request and may discontinue handling the call. In step 255, the multimode wireless device 111 and cordless phone base 135 continue the ongoing call.

Figure 2B:
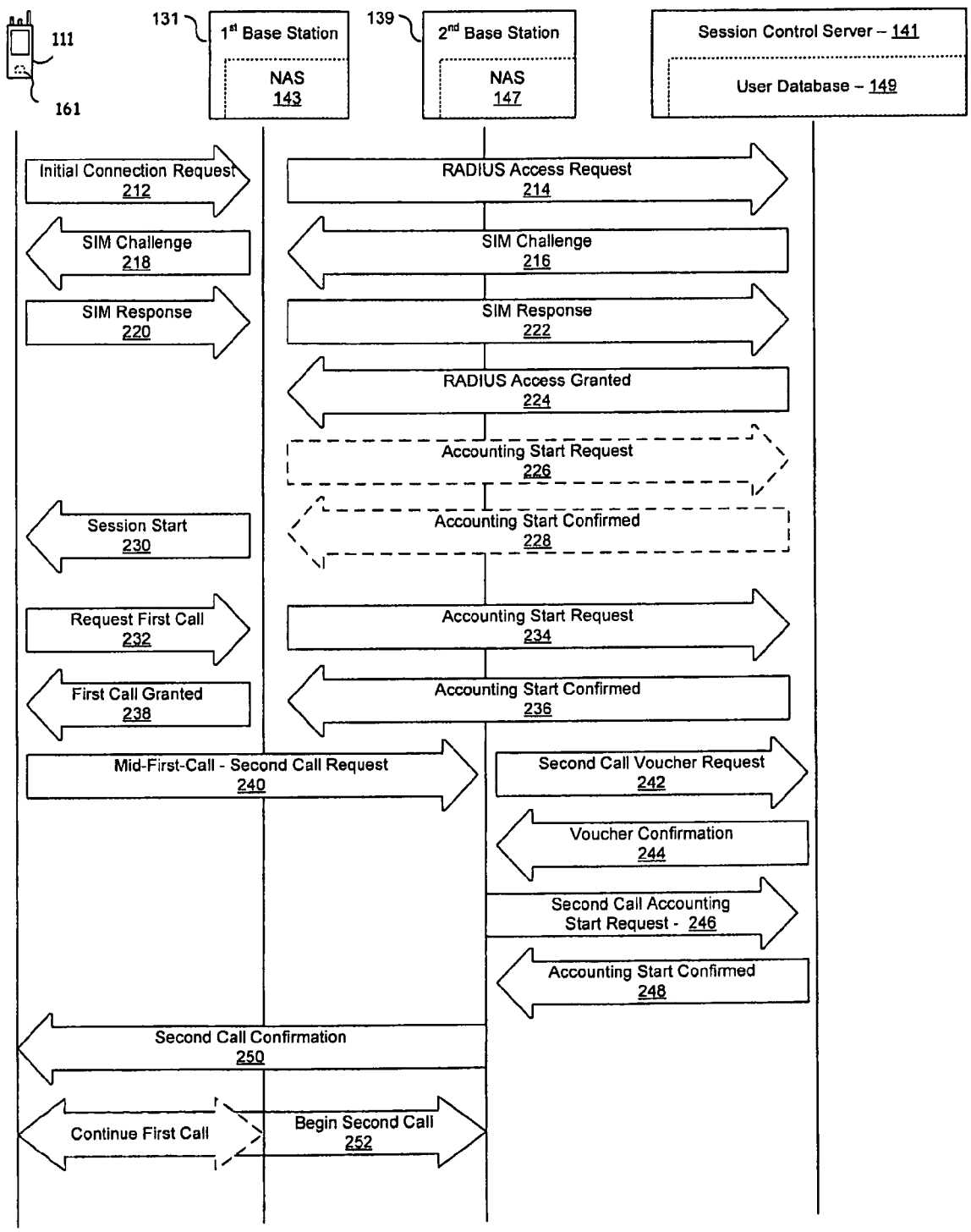
FIG. 2B is a flow diagram illustrating exemplary simultaneous sessions on a plurality of networks that are operated by a single service provider, in accordance with an embodiment of the invention.

FIG. 2B is an exemplary flow diagram illustrating simultaneous sessions on a plurality of networks that are operated by a single service provider, in accordance with an embodiment of the invention. Referring to FIG. 2B, there is shown the multimode wirless device 111, the SIM 161, the 3GPP base station 131, the network access server 143, the WIMAX base station 139, the network access server 147, the session control server (SCS) 141 and the user database 149.

The wireless device 111, the SIM 161, the 3GPP base station 131, the network access server 143, WIMAX base station 139, the network access server 147 and the session control server (SCS) 141 are similar and/or substantially the same as the respective picture elements described with respect to FIG. 1A and FIG. 1B. The user database 149 comprises subscriber and/or device data that is utilized during AAA transactions. For example, the user database 149 may comprise identity and/or security credentials for the user and/or the multimode wireless device 111, such as the subscriber service key.

In step 212, the multimode wireless device 111 sends an initial connection request to the 3GPP base station 131. In step 214, the network access server 143 sends a request utilizing RADIUS protocol, for example, to the SCS 141. In step 216, the SCS 141 sends a SIM challenge for the multimode wireless device 111 to the network access server 143. In various embodiments of the invention, the SIM challenge may comprise a number sequence. In step 218, the network access server 143 sends the SIM challenge to the multimode wireless device 111. In step 220, the multimode wirless device 111 determines a response to the SIM challenge based on its identity and/or security credentials. For example, the multimode wireless device may process the received number sequence with its subscriber service key and a hashing function to determine the SIM response. The multimode wireless device sends a SIM response to the network access server 143.

In step 222, the network access server 143 sends the SIM response to the SCS 141. In step 224, the SCS 141 determines the validity of the received SIM challenge response, determines priviliges and/or permissions allowed for the multimode wireless device and/or may determine applicable accounting methods for the multimode wireless device 111. The SCS 141 sends a message to the network access server 143 utilizing RADIUS protocol for example, that grants access and/or permissions to the multimode wireless device 111. In step 226, the network access server 143 may optionally request a start of accounting procedures that may enable billing to the SCS 141. In step 228, the SCS 141 may optionally begin accounting procedures for the multimode wireless device 111 and send an accounting start confirmed message to the network access server 143.

In step 230, the network access server 143 sends a session start to the multimode wireless device 111. In step 232, a call request may be sent from the multimode wireless device 111 to the network access server 143, for example, a user may initiate a call and/or data exchange to an entity within the communication system 105. For example, the multimode wireless device 111 may initiate a call to the telephone 113. In step 234, the network access server 143 sends an accounting start request to the SCS 141. In step 236, the SCS 141 determines accounting procedures for the call and returns an accounting start confirmed message to the network access server 143. In step 238, the network access server 143 may send a call message to the multimode wireless device 111 and a call may begin between the multimode wireless device 111 and the telephone 113 for example.

In step 240, during the call and/or data exchange, a user of the multimode wireless device 111 initiates a second simultaneous call and/or data exchange, for example, the multimode wireless device 111 may request a video stream or access to a website on the application server 129 within the IP network 123. In this regard, the multimode wireless device 111 and/or the single operator system 121 determines that a different base station or AP, for example, the WIMAX base station 139, that is part of another network within the single operator system 121, may handle the second call. The second call via the WIMAX base station 139 is initiated. The multimode wireless device 111 sends a second call request to the network access server 147 in the WIMAX base station 139. In step 242, the network access server 147 sends a second call AAA voucher request to the SCS 141.

In step 244, the SCS 141 determines authentication, authorization and/or accounting status for the multimode wireless device 111 based on the prior AAA transactions performed for step 224. The SCS 141 sends an AAA voucher to the network access server 147. In step 246, the network access server 147 sends a request to start accounting for the second call in order to handle the connection between the multimode wireless device 111 and the telephone 113 along with the video stream from the Internet 123. In step 248, the SCS 141 sends confirmation of the accounting start to the network access server 147. In step 250, the network access server 147 sends the multimode wireless device 111 confirmation of the request for the second simultaneous call and/or data exchange. In step 252, the multimode wireless device 111 continues the first call via the 3GPP base station 131 and begins the simultaneus data exchange via the WIMAX base station 139.

In an embodiment of the invention, a mobile wireless communication device 111 communicates information to a first network device, for example, the 3GPP base station 131 and/or the session control server 141 in a network 121 such that the first network device may authenticate, authorize and/or manage accounting for the mobile device 111 for use within the first network, for example a 3GPP network in the single operator system 121. When the mobile wireless communication device 111 is located within a service area of a second wireless network, for example, a WIMAX network within the single operator system 121 via the WIMAX base station 139, a communication session may be established with the second network based on the authentication, authorization and/or accounting management by the first network device. In this regard, the first network device, the 3GPP base station 131 and/or the session control server 141 communicates data related to the authentication, authorization and/or accounting management to a second network device, for example, the WIMAX base station 139 and/or the session control server 142, in the second network to enable the communication session with the mobile wireless communication device 111. A subscriber identity module (SIM) 161 of the mobile wireless communication device 111 comprises information that enables the first network device for example, the 3GPP base station 131 and/or the session control server 141 in a network 121, to communicate the data to the second network device within in the a single operator system 121. In this regard, the mobile communication device 111 may establish the communication session with the second network without transferring authentication, authorization and/or accounting management information to the second network device, for example the WIMAX base station 139 and/or the session control server 142. For example, during a communication session with the first network, the mobile communication device 111 is handed off to the second network. Furthermore, the mobile communication device 111 establishes simultaneous communication sessions with the first network and the second network utilizing the data related to the authentication, authorization and/or accounting management for the first network. The first network device the 3GPP base station 131 and the second network device the WIMAX base station 139 and/or another network device that may enable authentication, the authorization and/or the accounting management may comprise a session control server. The session control server 141 is shared by the first network and the second network. In various embodiments of the invention, the mobile wireless communication device 111 receives, stores and/or modifies additional information associated with the authentication, authorization and/or accounting management from the second network device the WIMAX base station 139 and/or the session control server 142.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for single operator, single SIM, single billing entity supporting simultaneous use of multi-radio device and/or phone.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A communication device operable to communicate with a first communication network managed by a first service provider, a second communication network managed by a second service provider, and a security architecture within the first communication network, the first communication network including a first access point device that utilizes a first wireless communication standard, the second communication network including a second access point device that utilizes a second wireless communication standard, the communication device comprising:

a user device having a secure identification processing system,
    the user device operable to gain authorized access to the first communication network by a first security challenge request received from the security architecture within the first communication network, where the secure identification processing system generates a first security response to the first security challenge request; and
    the user device operable to gain authorized access to the second communication network using, when access to the first communication network is available, a first authentication approach, and using, when access to the first communication network is not available, a second authentication approach, the first authentication approach comprising an exchange of a security voucher between the first communication network and the second communication network, the second authentication approach comprising a second security challenge request received from the second communication network, where the secure identification processing system generates a second security response to the second security challenge request.

2. The communication device of claim 1, wherein the user device is operable, when using the first authentication approach, to gain authorized access to the second communication network without using the second authentication approach.

3. The communication device of claim 1, wherein the user device is operable, when using the first authentication approach, to gain authorized access to the second communication network without the second security response.

4. The communication device of claim 1, wherein the user device is operable to gain authorized access to the second communication network in response to the exchange of the security voucher between the first communication network and the second communication network is performed by a session control server.

5. The communication device of claim 1, wherein said first communication network and said second communication network share a session control server, wherein the session control server is operable to perform the exchange of the security voucher between the first communication network and the second communication network.

6. The communication device of claim 1, wherein the user device is operable to establish simultaneous communication sessions with the first access point and the second access point.

7. The communication device of claim 1, wherein the user device is operable to receive from the second communication network additional information associated with the security voucher.

8. The communication device of claim 7, wherein the user device is operable to store the additional information associated with the security voucher.

9. The communication device of claim 7, wherein the user device is operable to modify the additional information associated with the security voucher.

10. A communication method for authenticating a user device in a first communication network managed by a first service provider, a second communication network managed by a second service provider, the first communication network including a first access point device that utilizes a first wireless communication standard, the second communication network including a second access point device that utilizes a second wireless communication standard, the communication method comprising:

at the user device, receiving from the first communication network a first security challenge request of the first communication network;

determining by a secure identification processing system of the user device a first challenge response to the first security challenge request of the first communication network;

responding to the first security challenge request of the first communication network with the first challenge response;

gaining authorized access to the first communication network based on the first challenge response; and gaining authorized access to the second communication network based on an exchange of a security voucher between the first communication network and the second communication network, wherein the security voucher is not transferred from the user device.

11. The communication device of claim 10, wherein the user device is operable to communicate data associated with the security voucher to the first communication network via an extension of the first communication network that comprises a portion of the second communication network.

12. The communication method of claim 11, wherein the secure identification processing system of the user device comprises a subscriber security module (SIM).

13. The communication method of claim 11, wherein the first challenge response comprises authentication, authorization, and/or accounting information for the first communication network.

14. The communication method of claim 11, wherein the exchange of the security voucher between the first communication network and the second communication network is performed by a session control server.

15. The communication method of claim 11, wherein the first communication network and the second communication network share a session control server, wherein the session control server is operable to perform the exchange of the security voucher between the first communication network and the second communication network.

16. The communication method of claim 11, further comprising establishing by the user device simultaneous communication sessions between the user device and the first access point device and between the user device and the second access point device.

17. The communication method of claim 11, further comprising receiving by the user device additional information associated with the security voucher from the second communication network.

18. The communication method of claim 17, further comprising storing by the user device the additional information associated with the security voucher from the second communication network.

19. The communication method of claim 17, further comprising modifying by the user device the additional information associated with the security voucher from the second communication network.

20. The communication method of claim 11, wherein the second communication standard comprises WIMAX.

* * * * *